D. K. INNES & W. W. MAGILL.

Improvement in Mantles and Fronts for Fire Places.

No. 4,613. Reissued Oct. 31, 1871.

ATTEST.
J. Schneider
Walter Allen

Inventors
D. K. Innes
W. W. Magill
By Knight Bros Attys

AM. PHOTO-LITHOGRAPHIC CO. N.Y. (OSBORNE'S PROCESS.)

UNITED STATES PATENT OFFICE.

DAVID K. INNES AND WESLEY W. MAGILL, OF CINCINNATI, OHIO.

IMPROVEMENT IN MANTELS AND FRONTS FOR FIRE-PLACES.

Specification forming part of Letters Patent No. 117,294, dated July 25, 1871; reissue No. 4,613, dated October 31, 1871

DIVISION B.

*To all whom it may concern:*

Be it known that we, DAVID K. INNES and WESLEY W. MAGILL, both of Cincinnati, Hamilton county, Ohio, have invented a certain Improvement in Mantel-Fronts for Fire-Places, of which the following is a specification:

Our invention relates to a construction of mantel-front for fire-places composed partly of metallic and partly of non-metallic minerals; and consists in making the central ornament or "key" to consist of a casting having a shank or anchor for attachment to a front plate of slate, marble, or other mineral. By thus combining a metallic with a non-metallic material we are enabled to manufacture a more perfect mantel than could be produced with either material alone, and at a cheaper rate.

Figure 1:
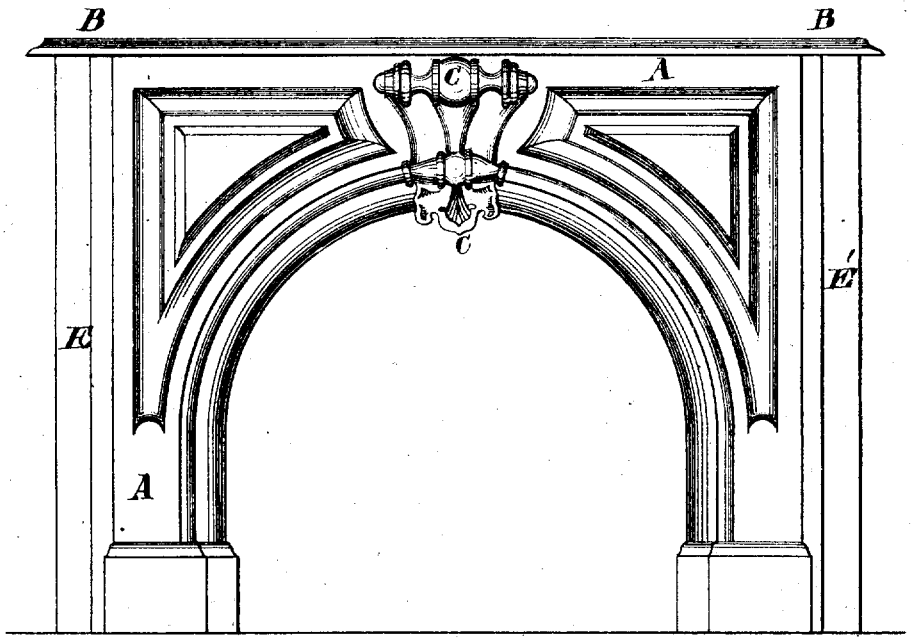
Figure 2:
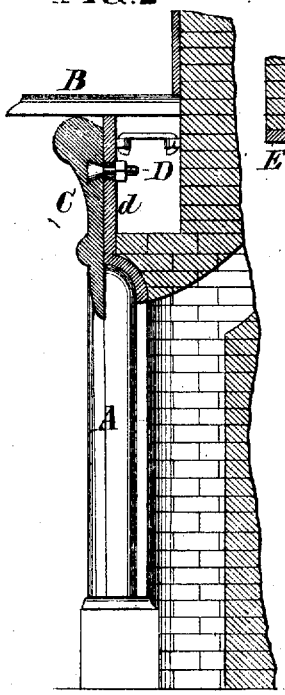
Figure 3:
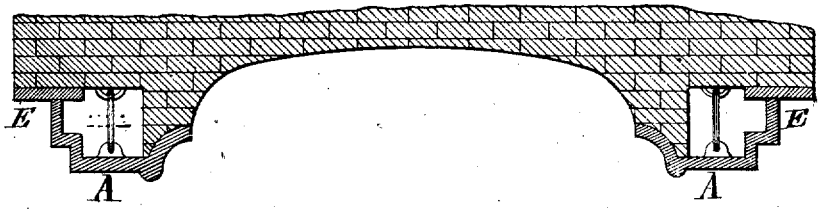
Figure 4:
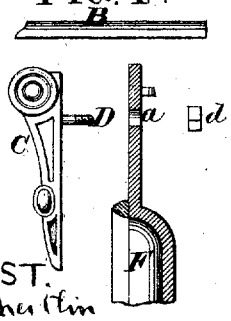

Figure 1 is a front elevation of a mantel embodying our improvement. Fig. 2 is a vertical section of the same. Fig. 3 is a horizontal section of the mantel; and Fig. 4 is a vertical section through the upper part of the mantel, the shelf and key being in elevation and detached.

A represents a front or mantel-plate, which may be of slate, marble, or other mineral, and be secured to the chimney-wall in any suitable manner. The principal ornament or key C of the mantel is made of cast-iron, and has anchored in it a stem or shank, D, which is screw-threaded so as to receive a nut, *d*, whereby it is attached to the mantel, the stem *d* passing through an aperture in the front or mantel-plate for that purpose.

This key may be painted, marbleized, or otherwise adapted to harmonize with the mantel to which it is to be applied.

In constructing slate or marble mantels the key has heretofore been chiseled out by hand, thus making it the most expensive part of the mantel; but by making this member of cast-iron it can be applied to any kind of mantel at a mere nominal expense.

The key C being separable enables the purchaser to select the form he prefers, and the manufacturer, by applying different keys to the same mantel, may vary its style and appearance to any desired extent. This detachable cast key greatly facilitates the manufacture of mantels, as such keys can be readily applied to slate, marble, or other mantels.

While describing the preferred form of our improvement, we reserve the right to vary the same in non-essential particulars. For example, the shank D, instead of being screw-threaded, may be slotted to receive an ordinary pin or key on the rear of the mantel-plate.

We claim as our invention—

1. The provision, in a non-metallic mantel, of the separable cast-iron key C, for the object stated.

2. The combination of the mantel A *a*, separable cast-iron key C, screw-threaded shank D, and nut *d*, for the purpose set forth.

In testimony of which invention we hereunto set our hands before two subscribing witnesses.

DAVID K. INNES.
WESLEY W. MAGILL.

Witnesses:
GEO. H. KNIGHT,
JAMES H. LAYMAN.

(154)